(12) United States Patent
Childs

(10) Patent No.: US 7,755,364 B2
(45) Date of Patent: *Jul. 13, 2010

(54) IMAGE SENSOR

(75) Inventor: Mark J. Childs, Sutton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 822 days.

This patent is subject to a terminal disclaimer.

(21) Appl. No.: 10/541,007

(22) PCT Filed: Dec. 19, 2003

(86) PCT No.: PCT/IB03/06161

§ 371 (c)(1),
(2), (4) Date: Jun. 28, 2005

(87) PCT Pub. No.: WO2004/062272

PCT Pub. Date: Jul. 22, 2004

(65) Prior Publication Data
US 2006/0164107 A1 Jul. 27, 2006

(30) Foreign Application Priority Data
Jan. 3, 2003 (GB) .................. 0300056.9

(51) Int. Cl.
G09G 5/00 (2006.01)
H03F 3/08 (2006.01)
H01J 40/14 (2006.01)

(52) U.S. Cl. .................. 324/501; 324/96; 250/208.1; 250/214 A; 345/204; 345/207

(58) Field of Classification Search .................. 324/501, 324/96; 250/370.08; 345/207
See application file for complete search history.

(56) References Cited

U.S. PATENT DOCUMENTS

| 3,114,884 | A | * | 12/1963 | Jakowatz | 327/552 |
| 3,652,948 | A | * | 3/1972 | Fierstien et al. | 330/276 |
| 4,097,814 | A | * | 6/1978 | Cohn | 330/286 |
| 5,142,239 | A | * | 8/1992 | Brayton et al. | 330/66 |
| 6,417,504 | B1 | * | 7/2002 | Kozlowski | 250/214 R |
| 6,538,245 | B1 | * | 3/2003 | Kozlowski | 250/208.1 |
| 6,653,636 | B2 | * | 11/2003 | Busse et al. | 250/370.09 |
| 6,858,912 | B2 | * | 2/2005 | Marshall et al. | 257/438 |
| 6,988,131 | B2 | * | 1/2006 | Kitamura | 709/217 |
| 7,133,074 | B1 | * | 11/2006 | Brehmer et al. | 348/308 |
| 2004/0183930 | A1 | * | 9/2004 | Masuyama et al. | 348/294 |
| 2005/0285960 | A1 | * | 12/2005 | Purcell et al. | 348/308 |

FOREIGN PATENT DOCUMENTS

JP 20020344809 A 11/2002
WO 0157554 A1 8/2001

OTHER PUBLICATIONS

M. A. Abdalla, et al: An Integrating CMOS APS for X-Ray Imaging with an In-pixel Preamplifier, vol. 466, No. 1, Jun. 2001, pp. 232-236, XP004251301.

* cited by examiner

Primary Examiner—Timothy J Dole
Assistant Examiner—John Zhu

(57) ABSTRACT

An image sensor has a plurality of pixels, each pixel having a photodiode (12), a voltage amplifier (16) having gain greater than 1 and a sampling capacitor (18) charged by the voltage amplifier. In this arrangement, each pixel provides gain through voltage amplification. This enables the sampling capacitor (18) to be kept to a low size, so that the pixel circuitry occupies the smallest possible space, thereby enabling large aperture pixels to be formed.

20 Claims, 3 Drawing Sheets

IMAGE SENSOR

This invention relates to image sensors, in particular having arrays of image sensing pixels, for example for use as solid state X-ray imaging devices.

There is significant interest in developing solid state X-ray imaging devices, to replace the image intensifiers currently used in hospitals.

Various pixel configurations have been proposed in which each pixel comprises a light sensitive element, such as a photodiode, and at least one switching device. For example, one known pixel design comprises a single thin film transistor (TFT) and a photodiode. During an exposure period, the TFT is turned off so that the photodiode is isolated. Incident light causes a minority carrier current to be produced, which causes the parasitic self-capacitance of the diode to be discharged. During the next readout, the capacitance of the diode is reset and the change in charge is detected by the amplifier.

It has also been proposed to provide in-pixel gain in order to improve the signal to noise ratio of the image sensor pixel. This is particularly desirable in Flat Dynamic X-Ray Detection (FDXD). The in-pixel amplification is performed before additional electronic noise is introduced.

One way to achieve in-pixel gain is to include an additional storage/sampling capacitor within the pixel configuration, with the charge stored on the sampling capacitor being greater than the charge generated by the photodiode. The sampling capacitor charge can then be measured by the readout amplifier.

U.S. Pat. No. 6,653,636 discloses a pixel configuration in which the voltage across the pixel photodiode (which is representative of the illumination level) is provided to a source follower circuit arrangement which acts as a unitary gain voltage buffer. The output voltage charges a sampling capacitor, and the gain of the pixel is dependent on the ratio of the capacitance of the sampling capacitor to the pixel capacitance. The circuit operates according to the principle of so-called "Double Correlated Sampling" (DCS). The double sampling approach eliminates noise induced by the resetting of the sampling capacitor and is particularly desirable for low noise amplification. DCS involves sampling the voltage across a sampling capacitor corresponding to a reset condition of the sensor element, so that the subsequent flow of charge to the sampling capacitor is representative of the change in voltage across the sensor element and not dependent on the reset state of the sensor element.

Whilst this circuit operates well, one problem with this approach is the area required for the sampling capacitor, which can limit the possible resolution which can be achieved. There is, however, a need to provide pixel gain with low noise.

According to the invention, there is provided an image sensor comprising a plurality of pixels, each pixel comprising:

a light sensor element, a sensor voltage across the element varying depending on the light incident on the element;

a voltage amplifier having gain greater than 1; and a sampling capacitor charged by the voltage amplifier.

In this arrangement, each pixel provides gain through voltage amplification. This enables the sampling capacitor to be kept to a low size, so that the pixel circuitry occupies the smallest possible space, thereby enabling large aperture pixels to be formed.

Although the self-capacitance of the light sensor element may be sufficient to store the photodiode voltage temporarily, each pixel preferably further comprises a pixel storage capacitor connected to the light sensor element. The capacitance of the sampling capacitor is then less than 10 times the capacitance of the pixel storage capacitor, preferably less than 2 times the capacitance of the pixel storage capacitor, and may be equal to the capacitance of the pixel storage capacitor.

Thus, the size of the sampling capacitor can be kept to a minimum.

The capacitance of the sampling capacitor may be in the range 0.5 pF to 3 pF, and the self-capacitance of light sensor or the capacitance of the pixel storage capacitor may also be in the range 0.5 pF to 3 pF. The gain of the voltage amplifier may be in the range 2 to 5.

The voltage amplifier may comprise first and second transistors in series between power lines, the light sensor element being connected to the gate of one of the transistors, and a bias voltage being connected to the gate of the other transistor, the output of the voltage amplifier being defined at the connection between the first and second transistors. This defines an arrangement in which the requirement for equal source-drain currents can be used to provide voltage amplification of the gate-source voltage signals.

The output of the voltage amplifier is preferably connected to one terminal of the sampling capacitor, the other terminal of the sampling capacitor being connected to the pixel output through an output switch. This output switch can be used both for connecting a charge sensitive amplifier to the output and for a resetting operation. Each pixel preferably further comprises an input switch for applying a fixed potential across the light sensor element, thereby providing a reset function.

The invention also provides a method of measuring light intensity of an image to be detected using a plurality of light sensor elements each forming a pixel of an image sensor, a sensor voltage across the elements varying depending on the light incident on the elements, the method comprising:

amplifying the sensor voltage using an in-pixel voltage amplifier having a gain greater than 1;

charging a sampling capacitor with the amplified voltage and measuring the flow of charge required to charge the sampling capacitor.

Preferably, a reset operation is carried out before amplifying the sensor voltage, the reset operation comprising applying a known potential to one terminal of the sampling capacitor and applying a known potential across the sensor element, the amplified voltage being subsequently applied to the other terminal of the sampling capacitor.

This reset operation samples the output of the voltage amplifier corresponding to a reset pixel, double correlated sampling can be implemented.

Examples of the present invention will now be described by way of example, with reference to and as shown in the accompanying drawings in which:

The same reference numbers are used throughout the Figures to denote the same or similar parts.

FIG. 1 shows in schematic form a pixel configuration of the invention, for use in a solid-state image sensor.

The pixel 10 comprises a light sensor element 12, in the form of a photodiode.

The photodiode signal is in the form of a current which is dependent on the light input and which flows for a defined time—the sample time. The signal to be sensed is thus a flow charge, which is a minority carrier current which discharges the self-capacitance of the photodiode during illumination. This flow of charge is converted to a voltage by a pixel capacitor 14.

A voltage across the photodiode thus varies depending upon the light incident on the photodiode. In the examples below, the pixel capacitor 14 is a separate component to the photodiode, but the photodiode self-capacitance can perform the same function.

Figure 1:
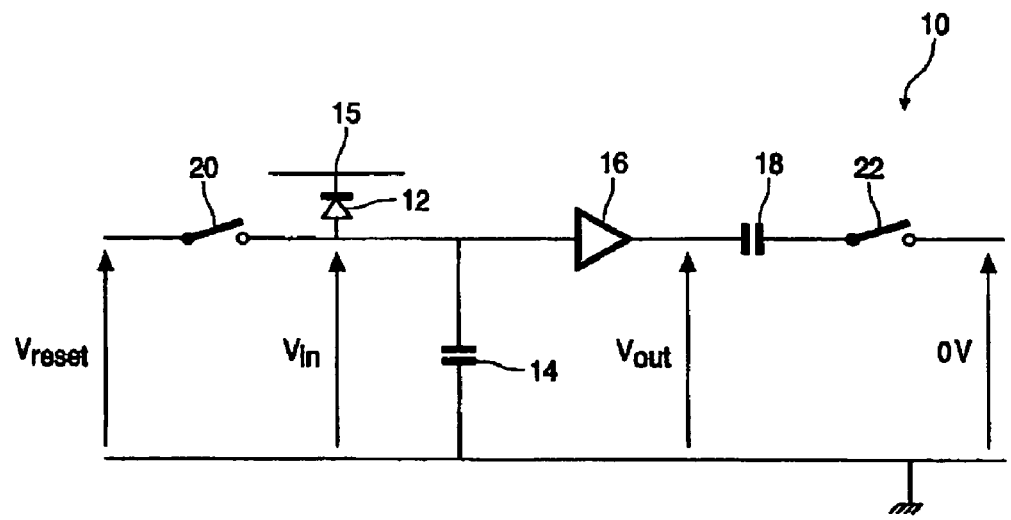
FIG. 1 shows schematically a pixel configuration for use in an image sensor according to the invention.

In FIG. 1, the pixel capacitor 14 is connected between the photodiode output (the cathode) and ground. Instead, the pixel capacitor may be in parallel with the photodiode. The photodiode of each pixel is connected at its anode to a voltage supply line 15.

The voltage Vin provided by the photodiode is amplified by an in-pixel amplifier 16 with gain G, so that a sampling capacitor 18 at the output of the amplifier is charged to a greater voltage than the photodiode voltage. As a result, a greater flow of charge is required, and this charge flow is measured as, the output of the pixel.

If the sampling capacitor 18 has the same capacitance as the pixel capacitor 14, the gain of the pixel is G, and there is no charge gain. However, the sampling capacitor 18 may be larger than the pixel capacitor 14 so that the circuit can implement voltage amplification as well as charge gain.

This circuit enables the size of the sampling capacitor to be reduced, so that the pixel circuit components can occupy a smaller space, thereby improving the optical aperture of the pixel.

A reset input switch 20 is provided at the input to the pixel, and this enables a rest voltage Vreset to be applied to the photodiode and pixel capacitor to reset the photodiode between read out cycles. An output switch 22 enables the output to be connected to a charge sensitive amplifier and also enables a reset sampling operation to be performed as described further below.

Before an exposure period, a reset operation is carried out by closing the reset input switch 20. This causes the photodiode to be charged to a known voltage. The voltage appearing at the output of the amplifier 16 is then sampled by closing the output switch 22 to charge the output plate of the sampling capacitor to a fixed potential, typically 0V. The output voltage corresponding to the amplified signal for a pixel in the reset condition is thus held across the sampling capacitor. The output switch 22 is then opened, as well as the input switch 20, and the pixel is illuminated.

The pixel capacitor 14 holds the resulting photodiode/pixel capacitor voltage, and this is amplified by the amplifier 16. As there is no charge path to the output plate of the sampling capacitor 22, the voltage on this plate rises with the output voltage of the amplifier. After illumination is complete, the output switch 22 is closed and the charge flow is measured to return the output plate of the sampling capacitor to 0V (i.e. to the same voltage applied to the sampling capacitor during the initial reset operation). Thus, the charge measured is independent of the voltage resulting from the reset operation, and in this way double correlated sampling is implemented.

Figure 2:
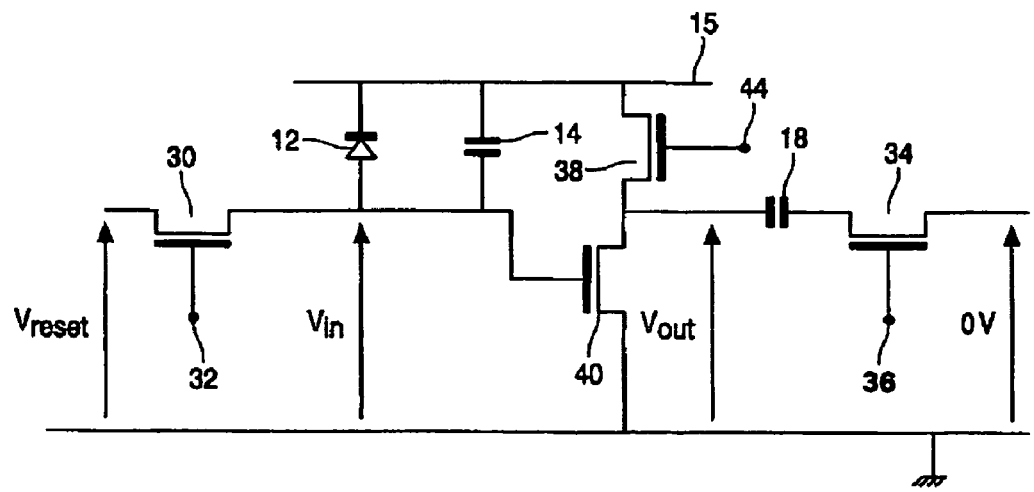
FIG. 2 shows in more detail a first implementation of the pixel circuit of FIG. 1.

FIG. 2 shows in more detail a first NMOS implementation of the pixel circuit of FIG. 1, and which may be implemented using amorphous silicon transistors. The same reference numerals are used as in FIG. 1 for the same components.

The input switch 20 is implemented as an input TFT (thin film transistor) 30 with its gate connected to a reset input control line 32. The output switch 22 is implemented as an output TFT 34 with its gate connected to an output control line 36. The amplifier 16 is implemented as first and second NMOS transistors 38, 40 which are connected in series between the voltage supply line 15 and ground 42.

When the amplifier is operating, the sampling capacitor is isolated by the output switch 22, so that the current flowing through the two transistors is constrained to be the same. The current through the transistor 40 is a function of the input voltage, which is the gate-source voltage. Similarly, the current through the transistor 38 is a function of the output voltage Vout, as the voltage between the output Vout and a fixed voltage bias 44 defines the gate-source voltage of the transistor 38. Thus, the amplifier stabilises when the output voltage is such as to match the source-drain current of the two transistors.

By appropriate design of the two transistors 38, 40, the amplifier provides voltage gain, by requiring a greater change in gate-source voltage for the transistor 38 than the change in gate-source voltage required for the transistor 40 in order to achieve the same change in source-drain current. The drain of each transistor 38 is connected to the fixed voltage supply line 15.

The gain provided may be in the range 1.5 to 10, preferably 2 to 5. The gain of the amplifier section is basically the square root of the ratio of the transconductances ($g_m$) of the two TFTs. The transconductance is proportional to the width to length ratio of the TFT channel, and can therefore be controlled by selection of the size and shape of the transistor channels. For example, for an amplifier with the upper TFT width 5 μm and lower TFT width 100 μm (both with length 5 μm), the ratio of widths is 20. This is directly (in first approximation) related to the transconductance $g_m$, and so the gain is about 4.5. In reality, the TFTs are not actually working in the ideal saturation region, and so gain is slightly different.

For operation in (or close to) the saturation region, the TFTs have to be appropriately biased. The higher the gate voltage, the greater the DC bias current through the amplifier. This speeds up the action of the pixel. However, it also tends to reduce the working range of the amplifier and so reduces dynamic range.

The specific implementation of the amplifier as well the bias conditions for appropriate operation will be routine to those skilled in the art.

The light sensor element is connected to the gate of one of the transistors 40, and a bias voltage 44 is connected to the gate of the other transistor 38, the output of the voltage amplifier being defined at the connection between the first and second transistors.

Figure 3:
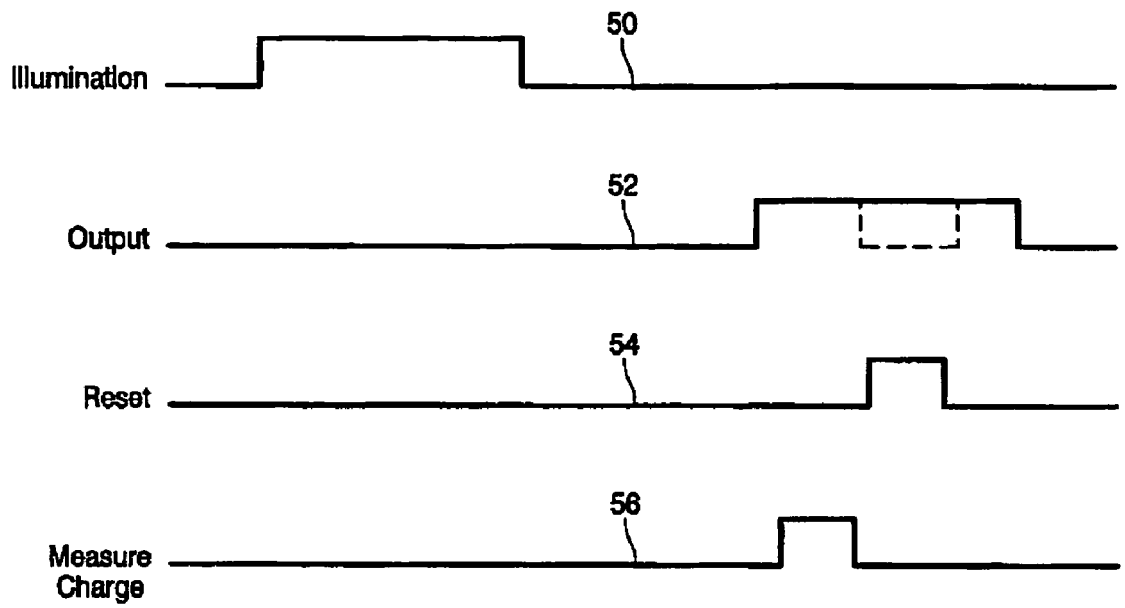
FIG. 3 shows timing diagrams to explain the operation of the circuit of FIG. 2.

FIG. 3 shows timing diagrams to explain the operation of the circuit of FIG. 2.

Plot 50 shows the exposure period during which the voltage on the pixel capacitor varies in dependence on the input voltage. During the exposure period, the input and output switches are open.

Plot 52 shows the operation of the output switch 22 and represents the signal applied to the output control line 36. Plot 54 shows the operation of the reset input switch 20 and represents the signal applied to the reset input control line 32. Plot 56 shows the operation of the charge measurement circuit connected to the output.

All pixels are illuminated simultaneously, and are subsequently read out in rows. Thus, each of the plots 52, 54, 56 may be applied in turn to the different rows of the array of pixels.

When signals stored in a row of pixels are to be read, the output switch for each column of pixels is first closed, and the respective charge sensitive amplifier then charges or discharges the sampling capacitor until the voltage on the output plate is equal to the voltage of the charge sensitive amplifier.

This is shown as plot 56. The charge sensitive amplifier has a virtual earth input, so that it holds the capacitor output plate to 0V, whilst the amplifier 16 maintains the amplified output voltage because the voltage input to the amplifier is held by the pixel capacitor 14. The flow of charge is measured, and represents the change in voltage across the photodiode.

Each column may be associated with a charge sensitive amplifier, so that all columns of pixels are read simultaneously, row by row. However, multiplexing arrangements may be used to reduce the number of charge sensitive amplifiers required.

At the end of the charge measurement operation, the photodiode is reset, by the pulse of plot 54. This places a fixed voltage across the photodiode. As the output switch 22 remains closed, a charge can be stored across the sampling capacitor, so that the reset noise is effectively sampled, and in this way double correlated sampling is implemented.

The reset pulse then ends, and shortly afterwards the output switch opens in preparation for the next illumination period.

A reset switch may be connected in parallel with the sampling capacitor 18 operated synchronously with the input switch 20, for assisting the discharge of the sampling capacitor after the charge measurement cycle. In this case, the output switch is preferably opened at this time, as shown in dotted lines in plot 52.

Figure 4:
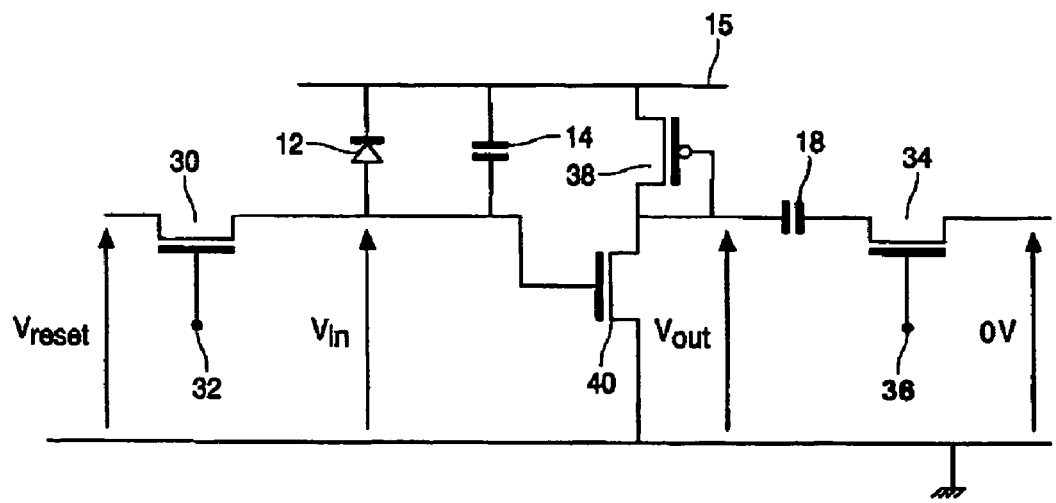
FIG. 4 shows in more detail a second implementation of the pixel circuit of FIG. 1.

FIG. 4 shows a second implementation of the pixel circuit of FIG. 1, which is a CMOS (polycrystalline silicon) implementation. The only difference between FIG. 4 and FIG. 2 is that the transistor 38 is implemented as a PMOS transistor, with the source and gate connected together.

Figure 5:
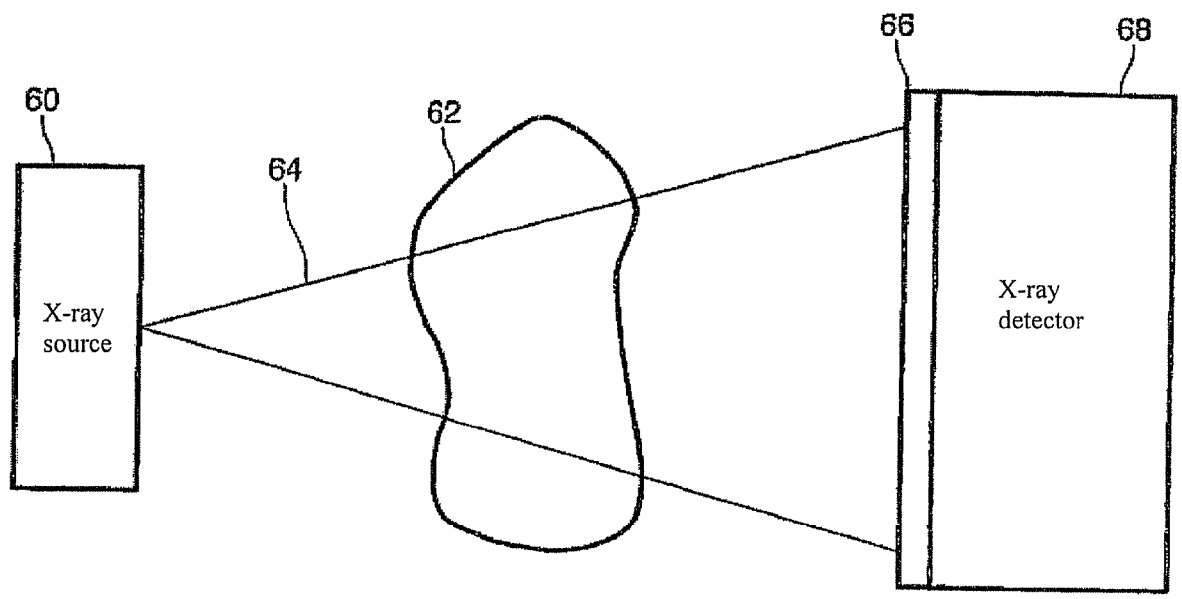
FIG. 5 shows an image sensor of the invention.

FIG. 5 shows a known X-ray examination apparatus which includes an X-ray source 60 for irradiating an object 62 to be examined, for example a patient to be radiologically examined, by means of an X-ray beam 64. Due to local differences in the X-ray absorption within the patient, an X-ray image is formed on an X-ray-sensitive surface 66 of the X-ray detector 68.

It is known to use as the X-ray detector 68 a solid state optical image sensor. The incident X-ray radiation is converted into light using a phosphor scintillator 66. This light can be detected by the solid-state device 68. Alternatively, an X-ray sensitive photoconductor can be used to convert the X-rays directly into electrons.

The pixel design of the invention is suitable for use in the solid state optical image sensor.

Various modifications will be apparent to those skilled in the art.

The invention claimed is:

1. An image sensor comprising a plurality of pixels, each pixel comprising:
    a light sensor element, a sensor voltage across the element varying depending on the light incident on the element;
    a voltage amplifier operatively connected to the light sensor element and having gain greater than 1;
    a pixel storage capacitor connected to the light sensor element; and
    a sampling capacitor charged by the voltage amplifier, the capacitance of the sampling capacitor being less than 10 times the capacitance of at least one of the pixel storage capacitor and a self-capacitance of the light sensor element.

2. The image sensor as claimed in claim 1, wherein the capacitance of the sampling capacitor is less than 2 times the capacitance of the pixel storage capacitor.

3. The image sensor as claimed in claim 2, wherein the capacitance of the sampling capacitor is approximately equal to the capacitance of the pixel storage capacitor.

4. An image sensor as claimed in claim 1, wherein the capacitance of the sampling capacitor is in the range 0.5 pF to 3 pF, and the capacitance of the pixel storage capacitor is in the range 0.5 pF to 3 pF.

5. The image sensor as claimed in claim 1, wherein a voltage gain between the pixel storage capacitor and the sampling capacitor is greater than one.

6. An image sensor comprising a plurality of pixels, each pixel comprising:
    a light sensor element, a sensor voltage across the element varying depending on the light incident on the element;
    a voltage amplifier operatively connected to the light sensor element and having gain greater than 1; and
    a sampling capacitor charged by the voltage amplifier, a capacitance of the sampling capacitor being less than 10 times a self-capacitance of the light sensor element.

7. The image sensor as claimed in claim 6, wherein the capacitance of the sampling capacitor is less than 2 times the self-capacitance of the light sensor element.

8. The image sensor as claimed in claim 6, wherein the capacitance of the sampling capacitor is in the range 0.5 pF to 3 pF, and the self-capacitance of light sensor is in the range 0.5 pF to 3 pF.

9. An image sensor comprising a plurality of pixels, each pixel comprising:
    a light sensor element, a sensor voltage across the element varying depending on the light incident on the element;
    a voltage amplifier having gain greater than 1; the voltage amplifier including:
        first and second transistors in series between power lines, the light sensor element being connected to the gate of one of the transistors, and a bias voltage being connected to the gate of the other transistor, an output of the voltage amplifier being defined at the connection between the first and second transistors and
    a sampling capacitor charged by the voltage amplifier.

10. The image sensor as claimed in claim 9, wherein each pixel further comprises a pixel storage capacitor connected to the light sensor element and wherein the voltage gain between the pixel storage capacitor and the sampling capacitor is greater than one.

11. The image sensor as claimed in claim 9, wherein the gain of the voltage amplifier is in the range 2 to 5.

12. The image sensor as claimed in claim 9, wherein the output of the voltage amplifier is connected to one terminal of the sampling capacitor, another terminal of the sampling capacitor being connected to a pixel output through an output switch.

13. The image sensor as claimed in claim 9, wherein each pixel further comprises an input switch for applying a fixed potential (Vreset) across the light sensor element.

14. The image sensor as claimed in claim 9, wherein the second transistor has a non-unity voltage amplification.

15. The image sensor as claimed in claim 9, wherein a capacitance of the sampling capacitor is in the range of 0.5 pF to 3 pF.

16. A method of measuring light intensity of an image to be detected using a plurality of light sensor elements each forming a pixel of an image sensor, a sensor voltage (Vin) across the sensor elements varying depending on the light incident on the sensor elements, the method comprising:
    amplifying the sensor voltage (Vin) using an in-pixel voltage amplifier having a gain greater than 1;
    charging a sampling capacitor with the amplified voltage (Vout);
    measuring a flow of charge required to charge the sampling capacitor; and before amplifying the sensor voltage (Vin), applying a known potential to one terminal of the sampling capacitor and applying a known potential (Vreset) across the sensor element to reset the sampling capacitor, the amplified voltage (Vout) being subsequently applied to the other terminal of the sampling capacitor.

17. The method as claimed in claim 16, wherein the voltage gain between a pixel storage capacitor and the sampling capacitor is greater than one.

18. The method as claimed in claim 16, wherein the gain of the voltage amplifier is in the range 2 to 5.

19. A method of measuring light intensity of an image to be detected using a plurality of light sensor elements each forming a pixel of an image sensor, a sensor voltage (Vin) across the sensor elements varying depending on the light incident on the elements, the method comprising:
- amplifying the sensor voltage (Vin) using an in-pixel voltage amplifier having a gain greater than 1;
- charging a sampling capacitor with the amplified voltage (Vout), the capacitance of the sampling capacitor being less than 2 times the capacitance of the pixel storage capacitor; and
- measuring a flow of charge required to charge the sampling capacitor.

20. The method as claimed in claim 19, wherein the capacitance of the sampling capacitor is approximately equal to the capacitance of the pixel storage capacitor.

* * * * *